(12) United States Patent
Touraud et al.

(10) Patent No.: US 8,680,199 B2
(45) Date of Patent: *Mar. 25, 2014

(54) REINFORCED POLYAMIDE COMPOSITION

(75) Inventors: Franck Touraud, Eyzin Pinet (FR); Stéphane Jeol, Lyons (FR)

(73) Assignee: Rhodia Operations, Aubervilliers (FR)

( * ) Notice: Subject to any disclaimer, the term of this patent is extended or adjusted under 35 U.S.C. 154(b) by 5 days.

This patent is subject to a terminal disclaimer.

(21) Appl. No.: 13/120,963

(22) PCT Filed: Sep. 25, 2009

(86) PCT No.: PCT/EP2009/062433
§ 371 (c)(1),
(2), (4) Date: Jun. 13, 2011

(87) PCT Pub. No.: WO2010/034803
PCT Pub. Date: Apr. 1, 2010

(65) Prior Publication Data
US 2011/0251341 A1    Oct. 13, 2011

(30) Foreign Application Priority Data

Sep. 26, 2008  (FR) ..................... 08 05300

(51) Int. Cl.
| | |
|---|---|
| *C08L 77/10* | (2006.01) |
| *C08L 77/02* | (2006.01) |
| *C08L 77/04* | (2006.01) |
| *C08G 69/08* | (2006.01) |
| *C08G 69/14* | (2006.01) |
| *C08G 69/30* | (2006.01) |
| *C08K 3/04* | (2006.01) |
| *C08K 3/10* | (2006.01) |
| *C08K 3/34* | (2006.01) |

(52) U.S. Cl.
USPC ........... 524/607; 524/414; 524/444; 524/496; 528/291; 528/324; 977/780

(58) Field of Classification Search
USPC .......... 524/607, 414, 444, 496; 528/291, 324; 977/780
See application file for complete search history.

(56) References Cited

U.S. PATENT DOCUMENTS

| 2,238,640 | A | | 4/1941 | Hanford | |
|---|---|---|---|---|---|
| 2,374,145 | A | | 4/1945 | Taylor | |
| 3,562,353 | A | * | 2/1971 | Chow et al. .................. | 525/431 |
| 5,143,956 | A | * | 9/1992 | Pielartzik et al. ............. | 524/219 |
| 6,677,015 | B2 | * | 1/2004 | Himmelmann et al. ..... | 428/35.7 |
| 8,334,359 | B2 | * | 12/2012 | Touraud et al. ............... | 528/196 |

FOREIGN PATENT DOCUMENTS

| DE | 4132080 A1 | | 4/1994 |
|---|---|---|---|
| JP | 2002-284872 | * | 10/2002 |
| JP | 2002284872 A | | 10/2002 |

OTHER PUBLICATIONS

International Search Report dated Mar. 24, 2010 issued in International Application No. PCT/EP2009/062433.

* cited by examiner

*Primary Examiner* — Tae H Yoon
(74) *Attorney, Agent, or Firm* — Dentons US LLP

(57) ABSTRACT

A polyamide modified by a compound including at least one hydroxyl group, as well as a method for preparing said polyamide and articles obtained from the modified polyamide are described. A polyamide composition including reinforcing fillers, and a modified polyamide obtained by polymerization from, in particular, a monofunctional hydroxyaromatic acid or amino acid compound in the presence of diacid, diamine and/or amino acid or lactam compounds are also described.

36 Claims, No Drawings

REINFORCED POLYAMIDE COMPOSITION

CROSS-REFERENCE TO RELATED APPLICATIONS

This application is the United States national phase of PCT/EP2009/062433, filed Sep. 25, 2009, and designating the United States (published in the French language on Apr. 1, 2010, as WO 2010/034803 A1; the title and abstract were also published in French) and claims priority under 35 U.S.C. §119 of FR 0805300, filed Sep. 26, 2008, each hereby expressly incorporated by reference in its entirety and each assigned to the assignee hereof.

The present invention relates to a polyamide modified by a compound comprising at least one hydroxyl group, to a process for the preparation of this polyamide and to articles obtained from this modified polyamide. The invention relates more particularly to a polyamide composition comprising reinforcing fillers and a modified polyamide obtained by polymerization starting from a monofunctional, in particular acid or amine, hydroxyaromatic compound in the presence of diacid, diamine and/or amino acid or lactam compounds.

Thermoplastic polymers are starting materials capable of being converted by molding, injection molding, injection/blow molding, extrusion, extrusion/blow molding or spinning, in particular into multiple articles, such as parts, for example for bodywork, which are blow-molded, extruded or molded, yarns, fibers or films, and the like.

There exists at least two major constraints in all these areas of conversion of thermoplastic polymer.

The first of these constraints is that the thermoplastic polymers employed have to be characterized, in the molten state, by a viscosity or a rheological behavior compatible with the forming processes targeted above. These thermoplastic polymers have to be sufficiently fluid when they are molten in order to be conveyed and handled easily and rapidly in some types of forming machinery.

The other constraint pressing on the thermoplastic polymer compositions is related to the mechanical qualities which they have to exhibit after having been melted, formed and hardened by cooling. These mechanical qualities are in particular the thermomechanical properties.

Among thermoplastic polymers, polyamides are polymers of great industrial and commercial interest, in particular aliphatic polyamides. These aliphatic polyamides can be easily synthesized and converted by the molten route. However, an ongoing search is underway to improve their mechanical properties, in particular their thermomechanical properties.

A first subject matter of the present invention is a composition comprising at least reinforcing fillers and a polyamide modified by a compound comprising at least one aromatic hydroxyl group chemically bonded to the chain of the polyamide, the polyamide being obtained by polymerization of at least the following monomers:
i) at least one hydroxyaromatic compound A) chosen from:
A2) a monofunctional hydroxyaromatic compound, the functional group of which can react with an amine functional group, and A4) a hydroxyaromatic monoamine, and
ii) at least polyamide monomers chosen from the group consisting of:
a mixture of an aliphatic, cycloaliphatic, arylaliphatic or aromatic diacid B) and of a diamine C), and/or
a lactam or an amino acid D).

Preferably, the polyamide is obtained by polymerization of at least the following monomers:
A) at least one hydroxyaromatic compound chosen from:
A2) a monofunctional hydroxyaromatic compound, the functional group of which can react with an amine functional group, and
A4) a hydroxyaromatic monoamine,
B) an aliphatic, cycloaliphatic, arylaliphatic or aromatic diacid,
C) a diamine, preferably an aliphatic diamine,
D) optionally a lactam or an amino acid, preferably an aliphatic lactam or amino acid.

The modified polyamide of the invention can be easily synthesized and converted by the molten route and it exhibits better mechanical properties, in particular thermomechanical properties, than an unmodified polyamide.

The term "aromatic hydroxyl group" is understood to mean a hydroxyl functional group attached to a carbon atom forming part of an aromatic ring.

The term "hydroxyaromatic compound" is understood to mean a compound comprising at least one aromatic hydroxyl group.

The term "chemically bonded" is understood to mean bonded via a covalent bond.

The hydroxyaromatic compound of the invention is an organic compound comprising at least one aromatic hydroxyl group.

The functional groups which can react with an amine functional group are in particular acid functional groups, the ketone functional group and the aldehyde functional group.

Compound having an "acid functional group" is understood to mean an organic compound comprising a carboxylic acid functional group or a functional group derived from carboxylic acid, such as an acid chloride, acid anhydride, amide or ester functional group.

The aromatic hydroxyl groups of the invention are not regarded as functional groups which react with acid functional groups.

Advantageously, the hydroxyl group of the monomer A) is not hindered, that is to say, for example, that the carbon atoms situated in the a position with respect to the hydroxyl functional group are preferably not substituted by bulk substituents, such as branched alkyls.

The compound A2) is preferably a compound of following formula (III):

$$(HO)_x—R''—COOH \qquad (III)$$

in which R" is a polyvalent (at least divalent) aromatic or arylaliphatic hydrocarbon radical and x is between 1 and 10.

The term "arylaliphatic radical" is understood to mean a radical according to which at least the acid functional group of the compound of formula (III) is not attached to this radical via a carbon atom forming part of an aromatic ring.

Advantageously, R" comprises between 6 and 18 carbon atoms.

The compound A2) can, for example, be 4-hydroxyphenylacetic acid or gallic acid. It is preferably 4-hydroxyphenylacetic acid.

In the context of the invention, mixtures of different compounds A2) can be employed.

The compound A4) is preferably a compound of following formula IV):

$$(HO)_x—R''—NH_2 \qquad (IV)$$

with R" and x as described above.

Mention may be made, as example of hydroxyaromatic monoamine A4), of tyramine, 3-aminophenol, 3-amino-4-methylphenol and 4-(2-aminoethyl)phenol.

When the monomer A) is solely of the A4) type, advantageously at least 3 carbon atoms separate the nitrogen atom of the amine functional group from the oxygen atom of the hydroxyl functional group, when the two amine and hydroxyl functional groups are attached to a carbon atom forming part of an aromatic ring, and at least 5 carbon atoms separate the nitrogen atom of the amine functional group from the oxygen atom of the hydroxyl functional group in the other cases.

Advantageously, the compound B) is of following formula (V):

HOOC—R'—COOH   (V)

in which R' is a divalent aliphatic, cycloaliphatic, arylaliphatic or aromatic hydrocarbon radical.

Preferably, the R' radical comprises between 2 and 18 carbon atoms.

The term "arylaliphatic diacid" is understood to mean a diacid, at least one of the acid functional groups of which is not attached to a carbon atom forming part of an aromatic ring.

According to a specific embodiment of the process of the invention, the compound B) is an aliphatic diacid. The aliphatic acid can, for example, be chosen from oxalic acid, maleic acid, succinic acid, pimelic acid or azelaic acid. It can also comprise unsaturations; this is the case, for example, with maleic acid or fumaric acid.

The dicarboxylic acids can also be chosen from glutaric acid, adipic acid, suberic acid, sebacic acid, dodecanedioic acid, 1,2- or 1,3-cyclohexanedicarboxylic acid, 1,2- or 1,3-phenylenediacetic acid, 1,2- or 1,3-cyclohexanediacetic acid, isophthalic acid, terephthalic acid, 4,4'-benzophenonedicarboxylic acid, 2,5-naphthalenedicarboxylic acid and p-(t-butyl)isophthalic acid. The preferred dicarboxylic acid is adipic acid.

In the context of the invention, mixtures of different compounds B) can be employed, in particular mixtures of aliphatic diacids and of aromatic diacids.

The modified polyamide of the invention is also obtained from a diamine monomer C), preferably an aliphatic diamine monomer.

The diamines of use in the present invention advantageously have the formula $H_2N-R-NH_2$ (VI), in which R is a divalent hydrocarbon radical, in particular an aliphatic, aromatic or arylaliphatic diradical or a substituted derivative of these diradicals. The R radical advantageously comprises between 2 and 18 carbon atoms.

The term "arylaliphatic diamine" is understood to mean a diamine, at least one of the amine functional groups of which is not attached to a carbon atom forming part of an aromatic ring.

Suitable aliphatic diamines comprise straight-chain aliphatic diamines, such as 1,10-diaminodecane, branched-chain aliphatic diamines, such as 2-methyl-1,6-diaminohexane, and cycloaliphatic diamines, such as di(aminomethyl) cyclohexanediamines.

The aliphatic chain can comprise heteroatoms, such as sulfur or oxygen, as represented by 3,3'-ethylenedioxybis (propylamine), and it can also carry substituents, such as halogen atoms, which do not react under the polymerization conditions.

Aromatic diamines suitable in the present invention comprise diamines in which R in the general formula is the phenylene group, a fused aromatic group, such as the naphthylene group, or two (or more) bonded aromatic nuclei, such as represented by bisphenylene, bisphenylenemethane, bisphenylenepropane, bisphenylene sulfone, bisphenylene ether and the like. Furthermore, any of the aromatic groups can carry one or more substituents on the nucleus, such as lower alkyl groups or halogen atoms, which do not react under the polymerization conditions. The diamine preferably comprises from 2 to 18 carbon atoms, more preferably from 4 to 12 carbon atoms. Particularly suitable diamines comprise diamines of the homologous series $H_2N(CH_2)_mNH_2$, in which m is an integer from 2 to 12, preferably from 4 to 8, and diamines of general formula $H_2N(CH_2)_pY(CH_2)_qNH_2$, in which Y is a phenylene radical and p and q are independently 1, 2 or 3. Mention may be made, as example of aromatic diamines, of meta-xylylenediamine or para-xylylenediamine.

The diamines can, for example, be chosen from hexamethylenediamine, butanediamine, 2-methylpentamethylenediamine, 2-methylhexamethylenediamine, 3-methylhexamethylenediamine, 2,5-dimethyl-hexamethylenediamine, 2,2-dimethylpentamethylene-diamine, nonanediamine, 5-methylnonanediamine, dodecamethylenediamine, 2,2,4- and 2,4,4-trimethylhexamethylenediamine, 2,2,7,7-tetramethyloctamethylenediamine, isophoronediamine, diaminodicyclohexylmethane and $C_2$-$C_{16}$ aliphatic diamines which can be substituted by one or more alkyl groups. The preferred diamine is hexamethylenediamine.

Mixtures of diamines can also be used in the present invention.

The modified polyamide of the invention can be obtained from in particular a lactam monomer or an amino acid D), preferably one which is aliphatic. Advantageously, the lactam or amino acid D) comprises between 2 and 18 carbon atoms. Mention may be made, as example of such lactams or amino acids, of caprolactam, 6-aminohexanoic acid, 5-aminopentanoic acid, 7-aminoheptanoic acid, 11-aminoundecanoic acid or dodecanolactam.

In the context of the invention, mixtures of different compounds D) can be employed.

When the monomer A) is solely of the A2) type, advantageously at least one amine functional group of the diamine C) is primary.

According to another subject matter, the invention provides a process for the preparation of the modified polyamide described above by melt polymerization of the monomers A) in the presence of the monomers B) and C) and/or D) described above, these monomers being present in all or in part.

Preferably, the melt polymerization is carried out in the presence of at least the monomers A), B), C) and optionally D) described above, these monomers being present in all or in part.

The expression "melt polymerization" is understood to mean that the polymerization is carried out in the liquid state and that the polymerization medium does not comprise a solvent other than water, optionally. The polymerization medium can, for example, be an aqueous solution comprising the monomers or a liquid comprising the monomers.

Advantageously, the polymerization medium comprises water as solvent. This facilitates the stirring of the medium and thus its homogeneity.

The polymerization medium can also comprise additives, such as chain-limiting agents.

The modified polyamide of the invention is generally obtained by polycondensation between the monomers described above in order to form polyamide chains with formation of the elimination product, in particular water, a portion of which may be vaporized.

The modified polyamide of the invention is generally obtained by heating, at high temperature and high pressure, for example an aqueous solution comprising the monomers or a liquid comprising the monomers, in order to evaporate the elimination product, in particular the water, present initially in the polymerization medium and/or formed during the polycondensation, while preventing any formation of solid phase in order to prevent the mixture from setting solid.

The polycondensation reaction is generally carried out at a pressure of approximately 0.5-2.5 MPa at a temperature of approximately 100-320° C. The polycondensation is generally continued in the molten phase at atmospheric or reduced pressure, so as to achieve the desired degree of progression.

The polycondensation product is a molten polymer or prepolymer. It can comprise a vapor phase essentially composed of vapor of the elimination product, in particular of water, capable of having been formed and/or vaporized.

This product can be subjected to stages of separation of vapor phase and of finishing in order to achieve the desired degree of polycondensation. The separation of the vapor phase can, for example, be carried out in a device of cyclone type. Such devices are known.

The finishing consists in keeping the polycondensation product in the molten state under a pressure in the vicinity of atmospheric pressure or under reduced pressure, for a time sufficient to achieve the desired degree of progression. Such an operation is known to a person skilled in the art. The temperature of the finishing stage is advantageously greater than or equal to 100° C. and in all cases greater than the temperature at which the polymer solidifies. The residence time in the finishing device is preferably greater than or equal to 5 minutes.

The polycondensation product can also be subjected to a solid-phase postcondensation stage. This stage is known to a person skilled in the art and makes it possible to increase the degree of polycondensation to a desired value.

The process of the invention is similar in its conditions to the conventional process for the preparation of polyamide of the type of those obtained from dicarboxylic acids and diamines, in particular to the process for the manufacture of polyamide 66 from adipic acid and hexamethylenediamine. This process for the manufacture of polyamide 66 is known to a person skilled in the art. The process for the manufacture of polyamide of the type of those obtained from dicarboxylic acids and diamines generally uses, as starting material, a salt obtained by mixing a diacid with a diamine in a stoichiometric amount, generally in a solvent, such as water. Thus, in the manufacture of poly(hexamethylene adipamide), the adipic acid is mixed with hexamethylenediamine, generally in water, in order to obtain hexamethylenediammonium adipate, better known under the name of Nylon salt or "N Salt".

Thus, when the process of the invention employs a diacid B) and a diamine C), these compounds can be introduced, at least in part, in the form of a salt of compound B) and of compound C). In particular, when the compound B) is adipic acid and the compound C) is hexamethylenediamine, these compounds can be introduced, at least in part, in the N salt form. This makes it possible to have a stoichiometric equilibrium.

The modified polyamide obtained at the end of the finishing stage can be cooled and formed into granules.

The modified polyamide obtained by the process of the invention in the molten form can be directly formed or can be extruded and granulated for subsequent forming after melting.

The modified polyamide of the invention exhibits the advantage of being able to be easily converted by the molten route, like aliphatic polyamides, for example, which facilitates the forming thereof. Furthermore, it exhibits improved thermomechanical properties; for example, they exhibit a higher glass transition temperature than aliphatic polyamides, in particular with the same molar mass. Finally, they show better water uptake properties, in comparison with aliphatic polyamides.

The polyamide of the invention can be in the form of a composition based on the modified polyamide as matrix and comprising additives, such as reinforcing fillers, flame retardants, UV stabilizers, heat stabilizers, mattifying agents, such as titanium dioxide, pigments, dyes, and the like.

The polyamide composition comprising reinforcing fillers is preferably prepared first by melt polymerization of the monomers and subsequent blending of the modifed polyamide formed with reinforcing fillers.

The composition can comprise reinforcing or bulking fillers, in particular fibrous and/or nonfibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among nonfibrous fillers, of all lamellar particulate fillers and/or exfoliable or nonexfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite or polymeric fillers, such as, for example, dimethacrylate particles.

Inorganic fillers are particularly preferred.

It is entirely possible according to the invention for the composition to comprise several types of reinforcing fillers.

Preferably, the most widely used filler can be glass fibers, of the "chopped" type, in particular having a diameter of between 7 and 14 µm. These glass fibers can exhibit a mean length of between 200 and 400 µm. These fillers can exhibit a surface sizing which provides for the mechanical adhesion between the fibers and the polyamide matrix.

The concentration by weight of the reinforcing or bulking fillers is advantageously betweeen 1 and 60% by weight, with respect to the total weight of the composition, preferably between 15 and 50%.

It is possible in particular to add, to the polyamide composition, agents which modify the impact strength. These are generally elastomeric polymers which can be used for this purpose. Toughness-modifying agents are generally defined as having an ASTM D-638 tensile modulus of less than approximately 500 MPa. Examples of suitable elastomers are ethylene/acrylic ester/maleic anhydride, ethylene/propylene maleic anhydride or EPDM (ethylene/propylene/diene monomer) polymers with optionally a grafted maleic anhydride. The concentration by weight of elastomer is advantageously between 0.1 and 30%, with respect to the total weight of the composition.

Preference is given in particular to the impact-modifying agents comprising functional groups which react with the polyamide. Mention may be made, for example, of ethylene, acrylic ester and glycidyl methacrylate terpolymers, ethylene and butyl ester acrylate copolymers, ethylene, n-butyl acrylate and glycidyl methacrylate copolymers, ethylene and maleic anhydride copolymers, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and their hydrogenated versions. The proportion by weight of these agents in the overall composition is in particular between 0.1 and 40%.

These fillers and additives can be added to the modified polyamide by normal means suited to each filler or additive, such as, for example, during the polymerization or in melt blending.

The materials of the invention are generally obtained by blending the various constituents under hot conditions, for example in a single- or twin-screw extruder, at a temperature sufficient for maintaining the polyamide resin as a molten medium, or under cold conditions, in a mechanical mixer in particular. The composition is preferably produced by blending the materials as a molten phase. Generally, the blend obtained is extruded in the form of rods which are cut into pieces in order to form granules. The compounds can be added at any point in the process for the manufacture of the plastic material, in particular by hot or cold blending with the plastic matrix. The addition of the compounds and additives can be carried out by addition of these compounds to the molten plastic matrix in the pure form or in the form of a concentrated blend in a matrix, such as, for example, a plastic matrix.

The modified polyamide of the invention can be used as starting material in the field of engineered plastics, for example for the production of molded articles by injection molding or by injection/blow molding, of extruded articles by conventional extrusion or by extrusion/blow molding, or of powders.

The present invention thus also relates to an injection-molding process in which a composition according to the invention, in particular in the form of granules, is introduced into an injection-molding device and the molding is carried out.

The term "and/or" includes the meanings "and", "or" and all the other possible combinations of the elements connected to this term.

Other details or advantages of the invention will become more clearly apparent in the light of the examples given below.

EXAMPLES

Characterizations

Contents of acid end groups (CEGs) and amine end groups (AEGs): titrated by potentiometry, expressed in meq/kg.

Number-average molar mass, determined by the formula $Mn=2 \cdot 10^6/(AEG+CEG)$ and expressed in g/mol.

Melting point ($T_m$) and associated enthalpy ($\Delta Hf$), and crystallization temperature on cooling ($T_c$): determined by differential scanning calorimetry (DSC) using a Perkin Elmer Pyris 1 device at a rate of 10° C./min.

Glass transition temperature ($T_g$), determined on the same device at a rate of 40° C./min.

Example 1, Comparative 1

Unmodified PA 66

92.6 kg (353 mol) of N salt (1:1 salt of hexamethylenediamine and of adipic acid), 84 kg of demineralized water and 6.4 g of antifoaming agent Silcolapse 5020® are introduced into a polymerization reactor. The polyamide 66 is manufactured according to a standard process for polymerization of polyamide 66 type, with 30 minutes of finishing at atmospheric pressure. The polymer obtained is cast in the rod form, cooled and formed into granules by cutting the rods.

The polymer obtained exhibits the following characteristics: CEG=70.2 meq/kg, AEG=51.5 meq/kg, Mn=16 430 g/mol.

The polyamide 66 is semicrystalline and has the following thermal characteristics:

$Tg=70.6°$ C., $Tc=230.9°$ C., $Tm=263.7°$ C., $\Delta Hf=68.4$ J/g.

Example 1, Comparative 2

Unmodified PA 66 of Low Molar Mass 90.75 kg (345.9 mol) of N salt (1:1 salt of hexamethylenediamine and of adipic acid), 939 g of 100% acetic acid (15.63 mol), 3.05 kg of a 32.6% by weight aqueous hexamethylenediamine solution (8.56 mol), 83.5 kg of demineralized water and 6.4 g of antifoaming agent Silcolapse 5020® are introduced into a polymerization reactor. The polyamide 66 is manufactured according to a standard process for polymerization of polyamide 66 type, with 30 minutes of finishing at atmospheric pressure. The polymer obtained is cast in the rod form, cooled and formed into granules by cutting the rods.

The polymer obtained exhibits the following characteristics: CEG=59.9 meq/kg, AEG=65.7 meq/kg and an acetic acid content AcEG=193 meq/kg (calculated from the starting amounts of reactants introduced into the synthesis reactor), i.e. $Mn=2 \cdot 10^6/(AEG+CEG+AcEG)=6280$ g/mol.

The polyamide 66 of low molar mass is semicrystalline and has the following thermal characteristics:

$Tg=61.3°$ C., $Tc=232.3°$ C., $Tm=263.1°$ C., $\Delta Hf=74.5$ J/g.

Example 1, Comparative 3

Unmodified PA 66 of Low Molar Mass 125.1 g (0.48 mol) of N salt (1:1 salt of hexamethylenediamine and of adipic acid), 17.41 g of 100% adipic acid (0.12 mol), 22.45 g of a 32.25% by weight aqueous hexamethylenediamine solution (0.06 mol), 120.6 g of demineralized water and 2 g of an antifoaming agent are introduced into a polymerization reactor. The polyamide 66 is manufactured according to a standard process for polymerization of polyamide 66 type, with 30 minutes of finishing under a vacuum of less than 50 mbar. The polymer obtained is cast on a plate.

The polymer obtained exhibits the following characteristics: CEG=821 meq/kg, AEG=0 meq/kg, i.e. Mn=2440 g/mol.

The polyamide 66 of low molar mass is semicrystalline and has the following thermal characteristics:

$Tg=52.4°$ C., $Tc=234.9°$ C., $Tm=260.6°$ C., $\Delta Hf=76.7$ J/g.

Example 2

Preparation of a Polyamide PA 66 Phenol-Functionalized by a Monoamino-Phenol 133.74 g of N salt (0.51 mol), 7.85 g of 99% tyramine (0.057 mol), 4.14 g of adipic acid (0.028 mol), 132.52 g of demineralized water and 2 g of an antifoaming agent are introduced into a polymerization reactor. The polyamide is manufactured according to a standard process for polymerization of polyamide 66 type with 30 minutes of finishing at atmospheric pressure. The polymer obtained is cast on a plate.

The polymer obtained exhibits the following characteristics:

CEG=92.7 meq/kg, AEG=38.5 meq/kg. The theoretical amount of phenol functional groups at the PEG chain end is calculated from the starting amounts introduced into the reactor. PEG=434 meq/kg. $Mn=2 \cdot 10^6/(AEG+CEG+PEG)=3540$ g/mol.

The polyamide PA 66 phenol-functionalized by tyramine is semicrystalline and has the following thermal characteristics: Tg=72.4° C., Tc=233.9° C., Tm=256.7° C., ΔHf=84.8 J/g.

Example 3

Preparation of a Polyamide PA 66 Phenol-Functionalized by a Monoacid-Phenol 135.2 g of N salt (0.52 mol), 9.41 g of 98% 4-hydroxyphenylacetic acid (0.06 mol), 10.87 g of a 32.4% aqueous hexamethylenediamine solution (0.03 mol), 127.2 g of demineralized water and 2 g of an antifoaming agent are introduced into a polymerization reactor. The polyamide is manufactured according to a standard process for polymerization of polyamide 66 type with 30 minutes of finishing at atmospheric pressure. The polymer obtained is cast on a plate.

The polymer obtained exhibits the following characteristics:

CEG=103.3 meq/kg, AEG=29.4 meq/kg. The theoretical amount of phenol functional groups at the PEG chain end is calculated from the starting amounts introduced into the reactor. PEG=437 meq/kg. Mn=2 $10^6$/(AEG+CEG+PEG)=3510 g/mol.

The polyamide PA 66 phenol-functionalized by 4-hydroxyphenylacetic acid is semicrystalline and has the following thermal characteristics: Tg=61.5° C., Tc=231.9° C., Tm=259° C., ΔHf=81.5 J/g.

Example 4

Preparation of a Polyamide PA 66 Phenol-Functionalized by a Monoacid-Phenol 142.8 g of N salt (0.544 mol), 4.57 g of 98% 4-hydroxyphenylacetic acid (0.03 mol), 5.28 g of a 32.4% aqueous hexamethylenediamine solution (0.015 mol), 132 g of demineralized water and 2 g of an antifoaming agent are introduced into a polymerization reactor. The polyamide is manufactured according to a standard process for polymerization of polyamide 66 type with 30 minutes of finishing at atmospheric pressure. The polymer obtained is cast on a plate.

The polymer obtained exhibits the following characteristics:

CEG=102.4 meq/kg, AEG=31 meq/kg. The theoretical amount of phenol functional groups at the PEG chain end is calculated from the starting amounts introduced into the reactor. PEG=223 meq/kg. Mn=2 $10^6$/(AEG+CEG+PEG)=5610 g/mol.

The polyamide PA 66 phenol-functionalized by 4-hydroxyphenylacetic acid is semicrystalline and has the following thermal characteristics: Tg=66.8° C., Tc=234.7° C., Tm=262.9° C., ΔHf=81.9 J/g.

Example 5

Preparation of a Polyamide PA 66 Phenol-Functionalized by a Monoacid-Phenol 123.7 g of N salt (0.47 mol), 18.31 g of 98% 4-hydroxyphenylacetic acid (0.118 mol), 23.22 g of a 32.4% aqueous hexamethylenediamine solution (0.064 mol), 119.4 g of demineralized water and 2 g of an antifoaming agent are introduced into a polymerization reactor. The polyamide is manufactured according to a standard process for polymerization of polyamide 66 type with 30 minutes of finishing under a vacuum of less than 10 mbar. The polymer obtained is cast on a plate.

The polymer obtained exhibits the following characteristics:

CEG=29.3 meq/kg, AEG=45.2 meq/kg. The theoretical amount of phenol functional groups at the PEG chain end is calculated from the starting amounts introduced into the reactor. PEG=911 meq/kg. Mn=2 $10^6$/(AEG+CEG+PEG)=2030 g/mol.

The polyamide PA 66 phenol-functionalized by 4-hydroxyphenylacetic acid is semicrystalline and has the following thermal characteristics: Tg=56.6° C., Tc=223.5° C., Tm=249.8° C., ΔHf=75.8 J/g.

Example 6

Preparation of PA 66/Glass Fiber 70/30 and PA Formulations

Formulations formed of polyamide/Vetrotex FV983 glass fibers in a 70/30 ratio by weight are produced in a DSM twin-screw microextruder at a screw speed of 100 rpm.

The polyamides used are those of examples 2 to 5, as well as that of example 1, comparative 3. The filler-comprising formulations were produced with heating temperatures of the extruder at 280° C. The rods produced by the extruder are poured into a water-cooling tank and subsequently granulated. The granules are subsequently dried in an oven under vacuum at 90° C. for 14 hours.

Example 7

Temperature-Sweep Dynamic Thermomechanical Analysis

The batches of formulations produced in example 6 are injection-molded using the injection module associated with the microextruder in the form of test specimens. The temperature of the mold is regulated at 80° C. These test specimens are subsequently cut out before being used to compare the thermomechanical properties of the formulations. Use is made of a TA Instruments RSA3 device which makes it possible to carry out 3-point bendings on the test specimens: a sinusoidal stress (frequency 1 Hz and amplitude 0.05%) is imposed on the sample and the values of the elastic moduli E' and loss moduli E" are collected. The measurements are carried out while following a temperature gradient from −40° C. to 250° C. at a rate of rise in temperature of 2° C./rain.

It is thus observed that the elastic moduli E' at 80° C. of the formulations based on modified PA according to the invention are greater than the elastic moduli E' of the formulation according to the prior art.

What is claimed is:

1. A composition comprising reinforcing fillers and a polyamide modified by a compound comprising at least one aromatic hydroxyl group chemically bonded to the chain of the polyamide, the polyamide being obtained by polymerization of the following monomers:
   i) a hydroxyaromatic monoamine (A4) having:
      at least 3 carbon atoms separating the nitrogen atom of the amine functional group from the oxygen atom of the hydroxyl functional group, when two amine and hydroxyl functional groups are attached to a carbon atom forming part of an aromatic ring, and at least 5 carbon atoms separating the nitrogen atom of the amine functional group from the oxygen atom of the hydroxyl functional group in the other cases, and ii) at least one polyamide monomer selected from the group consisting of:
a mixture of an aliphatic, cycloaliphatic, arylaliphatic or aromatic diacid B) and of a diamine C), and/or
a lactam or an amino acid D).

2. The composition as claimed in claim 1, wherein the modified polyamide is obtained by polymerization of the following monomers:
A) a hydroxyaromatic monoamine (A4),
B) an aliphatic, cycloaliphatic, arylaliphatic or aromatic diacid,
C) a diamine, and
D) optionally a lactam or an amino acid.

3. A composition comprising reinforcing fillers and a polyamide modified by a compound comprising at least one aromatic hydroxyl group chemically bonded to the chain of the polyamide, the polyamide being obtained by polymerization of the following monomers:
i) 4-hydroxyphenylacetic acid or tyramine, and
ii) at least one polyamide monomer selected from the group consisting of:
a mixture of an aliphatic, cycloaliphatic, arylaliphatic or aromatic diacid B) and of a diamine C), and/or
a lactam or an amino acid D).

4. The composition as claimed in claim 1, wherein the compound B) is of following formula (V):

HOOC—R'—COOH    (V)

in which R' is a divalent aliphatic, cycloaliphatic, arylaliphatic or aromatic hydrocarbon radical.

5. The composition as claimed in claim 4, wherein the R' radical comprises between 2 and 18 carbon atoms.

6. The composition as claimed in claim 4, wherein the compound B) is an aliphatic diacid.

7. The composition as claimed in claim 1, wherein the compound C) is of following formula (VI):

H$_2$N—R—NH$_2$    (VI)

in which R is a divalent aliphatic, cycloaliphatic, arylaliphatic or aromatic hydrocarbon radical.

8. The composition as claimed in claim 7, wherein the R radical comprises between 2 and 18 carbon atoms.

9. The composition as claimed in claim 1, wherein the lactam or amino acid D) comprises between 2 and 18 carbon atoms.

10. The composition as claimed in claim 1, wherein the reinforcing fillers are fibrous reinforcing fillers selected from the group consisting of glass fibers, carbon fibers, natural fibers, aramid fibers and nanotubes.

11. The composition as claimed in claim 1, wherein the reinforcing fillers are nonfibrous reinforcing fillers selected from the group consisting of alumina, carbon black, aluminosilicate clays, montmorillonites, zirconium phosphate, kaolin, calcium carbonate, diatomaceous earths, graphite, mica, silica, titanium dioxide, zeolites, talc and wollastonite.

12. The composition as claimed in claim 1, wherein said composition comprises between 1% and 60% by weight of reinforcing filler, with respect to the total weight of the composition.

13. The composition as claimed in claim 1, wherein said composition further comprises agents which modify the impact strength.

14. A process for the preparation of a composition as claimed in claim 1, said process comprising forming the modified polyamide by melt polymerizing the hydroxyaromatic monoamine (A4) in the presence of the monomers B) and C) and/or D) and blending the modified polyamide with reinforcing fillers.

15. An article obtained by forming from the composition as claimed in claim 1, by molding.

16. The composition as claimed in claim 2, wherein the diamine is an aliphatic diamine.

17. The composition as claimed in claim 2, wherein the optional lactam or amino acid is an aliphatic lactam or amino acid.

18. The composition as claimed in claim 10, wherein the nanotubes are carbon nanotubes.

19. The article of claim 15, wherein molding is selected from the group consisting of injection molding, injection/blow molding, extrusion/blow molding and extrusion molding.

20. The composition as claimed in claim 3, wherein the modified polyamide is obtained by polymerization of the following monomers:
A) the 4-hydroxyphenylacetic acid or the tyramine,
B) an aliphatic, cycloaliphatic, arylaliphatic or aromatic diacid,
C) a diamine, and
D) optionally a lactam or an amino acid.

21. The composition as claimed in claim 3, wherein the compound B) is of following formula (V):

HOOC—R'—COOH    (V)

in which R' is a divalent aliphatic, cycloaliphatic, arylaliphatic or aromatic hydrocarbon radical.

22. The composition as claimed in claim 4, wherein the R' radical comprises between 2 and 18 carbon atoms.

23. The composition as claimed in claim 4, wherein the compound B) is an aliphatic diacid.

24. The composition as claimed in claim 4, wherein the compound C) is of following formula (VI):

H$_2$N—R—NH$_2$    (VI)

in which R is a divalent aliphatic, cycloaliphatic, arylaliphatic or aromatic hydrocarbon radical.

25. The composition as claimed in claim 9, wherein the R radical comprises between 2 and 18 carbon atoms.

26. The composition as claimed in claim 4, wherein the lactam or amino acid D) comprises between 2 and 18 carbon atoms.

27. The composition as claimed in claim 21, wherein the reinforcing fillers are fibrous reinforcing fillers selected from the group consisting of glass fibers, carbon fibers, natural fibers, aramid fibers and nanotubes.

28. The composition as claimed in claim 21, wherein the reinforcing fillers are nonfibrous reinforcing fillers selected from the group consisting of alumina, carbon black, aluminosilicate clays, montmorillonites, zirconium phosphate, kaolin, calcium carbonate, diatomaceous earths, graphite, mica, silica, titanium dioxide, zeolites, talc and wollastonite.

29. The composition as claimed in claim 21, wherein said composition comprises between 1% and 60% by weight of reinforcing filler, with respect to the total weight of the composition.

30. The composition as claimed in claim 21, wherein said composition further comprises agents which modify the impact strength.

31. A process for the preparation of a composition as claimed in claim 21, said process comprising forming the modified polyamide by melt polymerizing the tyramine in the presence of the monomers B) and C) and/or D) and blending the modified polyamide with reinforcing fillers.

32. An article obtained by forming from the composition as claimed in claim 21, by molding.

33. The composition as claimed in claim 20, wherein the diamine is an aliphatic diamine.

34. The composition as claimed in claim 20, wherein the optional lactam or amino acid is an aliphatic lactam or amino acid.

35. The composition as claimed in claim 27, wherein the nanotubes are carbon nanotubes.

36. The article of claim 32, wherein molding is selected from the group consisting of injection molding, injection/blow molding, extrusion/blow molding and extrusion molding.

* * * * *